United States Patent [19]

Jensen

[11] 4,257,833

[45] Mar. 24, 1981

[54] METHOD OF MANUFACTURE OF CABLE BELTS HAVING GENERALLY SYMMETRICALLY TENSIONED CABLES

[75] Inventor: Larry W. Jensen, Marysville, Ohio

[73] Assignee: The Goodyear Tire & Rubber Company, Akron, Ohio

[21] Appl. No.: 95,805

[22] Filed: Nov. 19, 1979

[51] Int. Cl.³ .......................... B29S 17/00; G01B 5/24
[52] U.S. Cl. ........................................ 156/64; 474/263; 156/137; 156/157; 156/160; 156/161; 156/271; 156/494; 198/847; 264/229
[58] Field of Search ............... 156/137, 161, 157, 494, 156/160, 271, 64; 428/110, 112; 24/38; 264/229; 74/231 R, 237; 198/847

[56] References Cited

U.S. PATENT DOCUMENTS

| | | | |
|---|---|---|---|
| 1,512,096 | 10/1924 | Hopkinson | 74/231 R |
| 2,566,262 | 8/1951 | Traxler | 74/237 |
| 2,740,459 | 4/1956 | Kilborn et al. | 156/494 |
| 3,212,627 | 10/1965 | Beebee | 428/110 |

*Primary Examiner*—John J. Gallagher
*Attorney, Agent, or Firm*—D. M. Ronyak

[57] ABSTRACT

The longitudinal cables of a belt whose longitudinal centerline differs from that of the equipment on which it is produced and whose cable-to-cable spacing differs from that of the cable tensioner, are tensioned in a generally symmetrical pattern about the longitudinal centerline of the belt. An effective number of cables are directed from the proper edge at the comb into the center of the belt. One half of the remaining cables are moved over the same number of spaces, at the comb, toward the proper edge of the belt.

6 Claims, 5 Drawing Figures

METHOD OF MANUFACTURE OF CABLE BELTS HAVING GENERALLY SYMMETRICALLY TENSIONED CABLES

The abstract is not to be taken as limiting the invention of this application and in order to understand the full nature and extent of the technical disclosure of this application reference must be made to the accompanying drawings and the following detailed description.

This invention relates generally to the manufacture of conveyor belts of the type which include a plurality of cables extending throughout the lengthwise direction of the belts, the cables being spaced apart from one another in the transverse direction of the belt. More particularly, this invention relates to a method of manufacture of cable belts wherein the centerline of the belt as manufactured differs from that of the cable tensioner used in the manufacture of such belt.

In order to fully utilize their equipment and facilities, manufacturers have at times produced a single wide belt and slit the resulting single wide belt into two belts after curing. Due to the difference in the cable-to-cable spacing at the let off and tensioning device in comparison to the cable-to-cable spacing in the belt, there results an asymmetric tensioning of the cables within any belt produced whose centerline does not coincide with that of the equipment on which it is produced. When two belts are to be slit from a single wide belt, compensation can be made during installation of the belt by splicing end-to-end the slit belt portions such that that edge which was nearest the equipment centerline of one belt portion during manufacture is joined to that edge of the other belt portion which was nearest the equipment centerline during manufacture. Thus, although the two belts as simultaneously produced exhibit an asymmetric tensioning of their cables about the centerline of such slit belts, compensation may be effected by adjustment of the pulleys or guides when the belt is installed to permit satisfactory tracking or training of the conveyor belt in service.

When it is desired to produce three belts from a single wide belt, the just described procedure to compensate for asymmetric tension within each slit belt will not be adequate. The central slit belt will normally have its centerline coincident with that of the equipment on which it is produced and therefore exhibits no asymmetry tension of its cables about its centerline. Each of the two belts which is slit from an edge of the single wide belt in this instance will be asymmetric in the tensioning of its cables about its own centerline. Thus, when spliced together in end-to-end relationship, that belt which was slit from the center of the wide belt needs no compensation of the pulleys and guides. Any compensation which is provided for the asymmetry in those belts which are slit from the edges of the wide belt will negatively affect tracing of the slit central belt.

It is believed that if the cables of each individual belt are tensioned symmetrically about the centerline of each individual belt that tracking of the end-to-end spliced belts will be improved and that fewer adjustments of the pulleys will be required. It is thus desirable to provide a means for adjusting the cable tensions so that when two or more belts are slit from a single wide belt, the cables of each resulting belt will be tensioned symmetrically about the centerline of that individual slit belt. Symmetric tensioning can be accomplished by taking an effective number of cables from the proper edge of the narrow belt and by means of a series of guides moving these cables from that edge of the belt at the tensioner to the center of the belt at the comb. When the spacing between adjacent cables at the tensioner is greater than that at the comb, the proper edge is that edge of the belt most distant from the centerline of the equipment. When the spacing between the adjacent cables at the tensioner is less than that at the comb, the proper edge is that edge nearest the equipment centerline. One half of the remaining cables are moved over the same number of spaces at the comb as the number of cables moved into the cneter of the slit belt. The number of cables which will be effective in any given instance may be determined by determining the angle or displacement formed by the path of the cable at the edge opposite the proper edge as it extends between the tensioner and the comb relative to the longitudinal centerline of the slit belt. After determining this angle or displacement for the specific belt to be produced, that cable, counted from the proper edge of the tensioner, is determined which if moved to the proper edge of the belt at the comb would form an angle or displacement of about equal magnitude but opposite sense relative to the centerline of the belt. The number of cables passed over in arriving at this determination will be the effective number of cables for that belt. This procedure results in the lower tension cables being put into the center of a narrow slit belts whose longitudinal centerline varies from that of the equipment on which it is produced. It also results in the angle or displacement through which the cable is altered between the tensioner and the comb being approximately equal on each edge of the narrow belt.

Although not intended to be limiting of the invention, a better understanding of the invention may be had by reference to the accompanying drawings in which FIG. 1 is a schematic plan view of a cable belt production facility;

Figure 4:
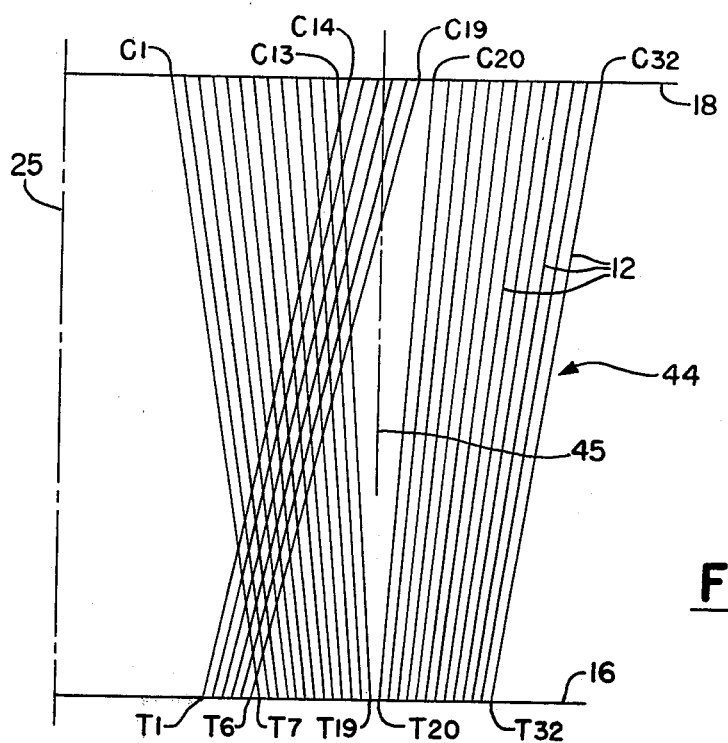
Figure 5:
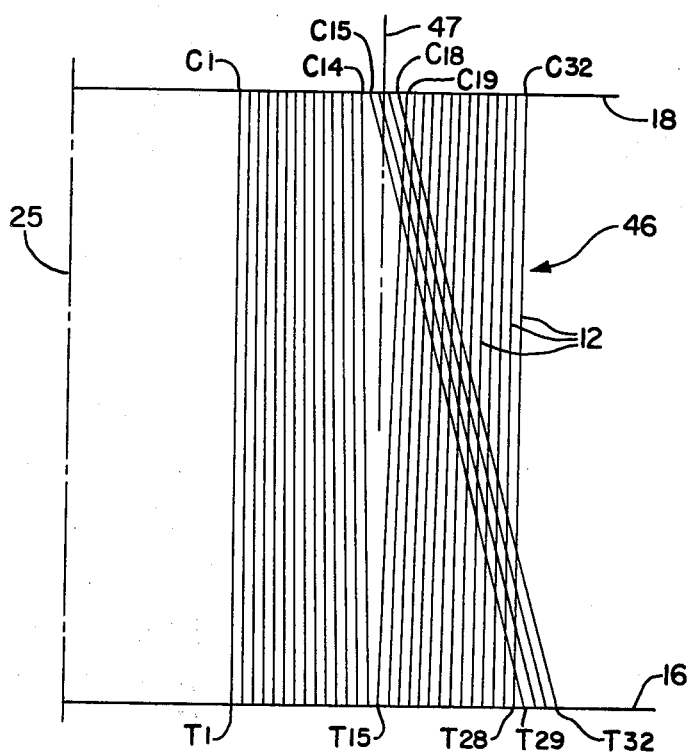

FIG. 4 illustrates the cable arrangement for an edge belt to be produced simultaneously with two other slit belts, the spacing between adjacent cables at the tensioner being less than that between adjacent cables at the comb; and FIG. 5 illustrates the cable arrangement of an edge belt to be produced simultaneously with two other belts, the spacing between adjacent cables at the tensioner being greater than that between adjacent cables at the comb.

Figure 1:
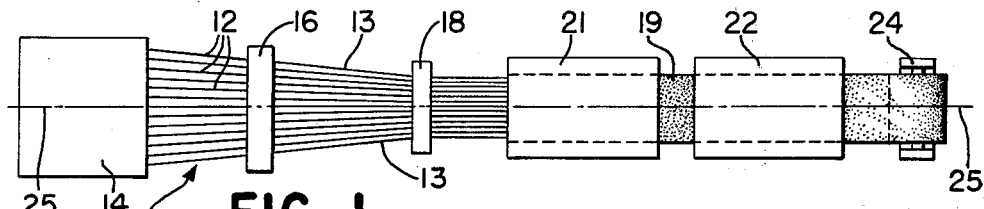

Referring now to FIG. 1, there is schematically illustrated in plan view a manufacturing facility 10 for the production of cable belts 19. Cable belts include a plurality of substantially parallel side-by-side cables 12 extending throughout the lengthwise direction of the belt which are typically embedded in elastomer or polymeric compounds. The manufacturing facility 10 inclues a cable let off 14 for dispensing of individual ones of the reinforcing cables 12. The cables 12 are led from the cable let off 14 to a cable tensioner 16. At the cable tensioner 16 individual cables 12 are trained through pulleys, or other guide means. The cable tensioner 16 maintains the tension of each cable 12 throughout the building area 21 and curing area 22. The spacing between adjacent cables 12 at the cable tensioner 16 is fixed at the time of design of the manufacturing facility 10 and cannot be thereafter easily altered. The cables 12 are thereafter trained through a comb 18 which arranges the cables at the proper cable-to-cable spacing for the belt product to be produced. The spacing between adjacent cables 12 at the comb 18 may be greater than, equal to, or less than that between adjacent cables at the tensioner 16. From the comb 18 the cables 12 are extended across a building area 21 wherein the elastomer components and other reinforcements of the belt 19 are added to complete the uncured belt product. The uncured belt product is then led into a curing press 22 to effect curing of same. The finished product may thereafter be wound up on a take-up 24 in the form of a large roll. Slitting of the wide belt into two or more narrower belts may be effected as the wide belt exists the curing press 22 or in a separate operation.

Whenever the spacing between adjacent cables 12 at the comb 18 differs from that between adjacent cables at the tensioner 16, frictional losses occur as the cables pass around the guide means, for example pins of the tensioner 16 and pins of the comb 18, for those cables whose paths are at an angle to the equipment centerline 25 between the tensioner 16 and the comb 18. It can be seen in FIG. 1 that the outermost cables 13, those which are furthest from the equipment centerline 25 exhibit the greatest angular displacement relative to the equipment centerline and thus are believed to undergo the greates loss in tension. Angular displacement of the cable as it extends between the tensioner 6 and the comb 18 is believed to cause a loss of tension due to friction against the guides as the cables 12 are tensioned. The frictional loss is believed to vary directly with the angular displacement reltive to the equipment centerline 25 through which the cable direction is altered. When a single cable belt is produced and the longitudinal centerline of that belt coincides with the longitudinal centrline 25 of the equipment on which it is produced the maximum cable tension is believed to occur in the center of the belt where the cables extend in a relatively straight path from the tensioner through the comb. In this case, the cable tension gradually tapers off to a lesser value as each edge of the belt is approached from the longitudinal centerline. Although in a typical production facility, the angulr path of the cables as they extend from the tensioner to the comb is relatively small, typically less than fifteen degrees, the tension losses are believed to be considerably greater than that due to the calculated angle alone due to the coefficient of friction of the material of the cable, which is typically steel, against that of the pins or guides of the comb, which also are typically of metal. In any event it is known that when two cable belts are sought to be produced simultaneously in side-by-side relationship by production of a wider belt which is thereafter slit into two narrow belts along its longitudinal centerline, care must be taken when splicing these belts together in end-to-end relationship so that the slit edges are joined to one another. When this is done the pulleys and/or guides of the conveyor can be adjusted so that the belt will track satisfactorily and not move transversely off the pulleys or guides. This transverse movement is believed due to differential tensions occurring acorss the width of the slit belts. In other words, the slit belts when made according to known methods are believed not to be tensioned symmetrically about their own individual longitudinal centerlines.

Substantially symmetrical tensioning of individual ones of a plurality of cable belts to be produced simultaneously in side-by-side relationship can be achieved by taking an effective number of cables 12 from the proper edge of the narrow belt and by means of a series of guides, for example rollers, moving these cables from that edge of the belt at the tensioner 16 to the center of the belt at the comb 18. One half of the remaining cables 12 of that belt are thereafter moved over the same number of spaces at the comb 17 as the number of cables which have been moved into the center of the belt at the comb.

Figure 2:
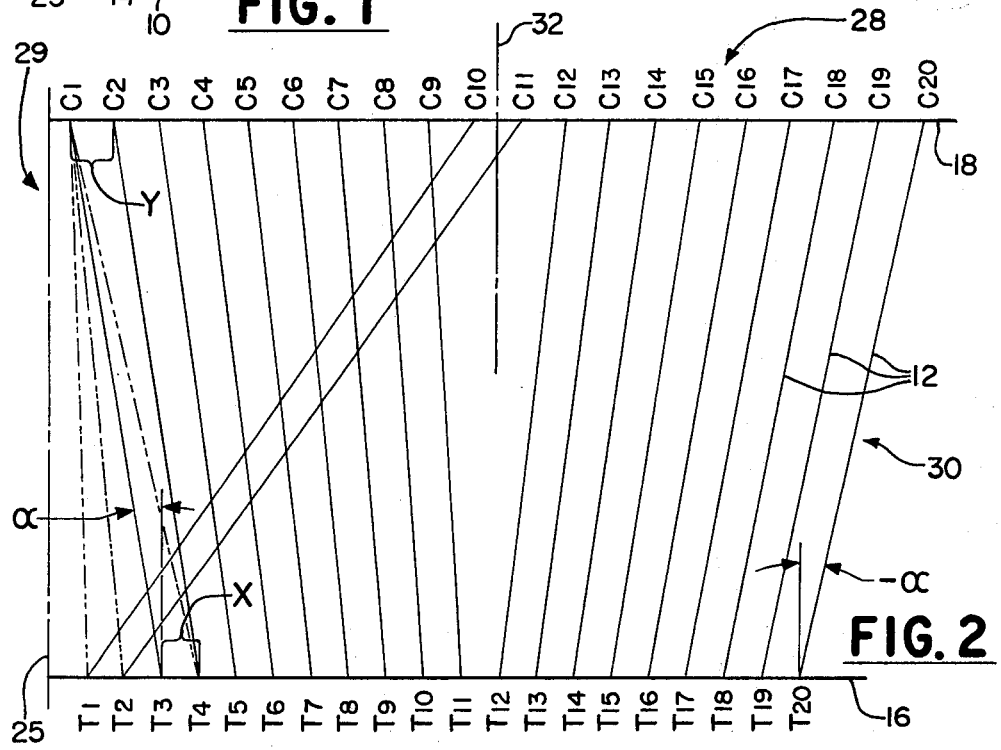
FIG. 2 illustrates a cable arrangement for the production of two slit belts simultaneously with the spacing between adjacent cables at the comb being greater than that at the tensioner.
Figure 3:
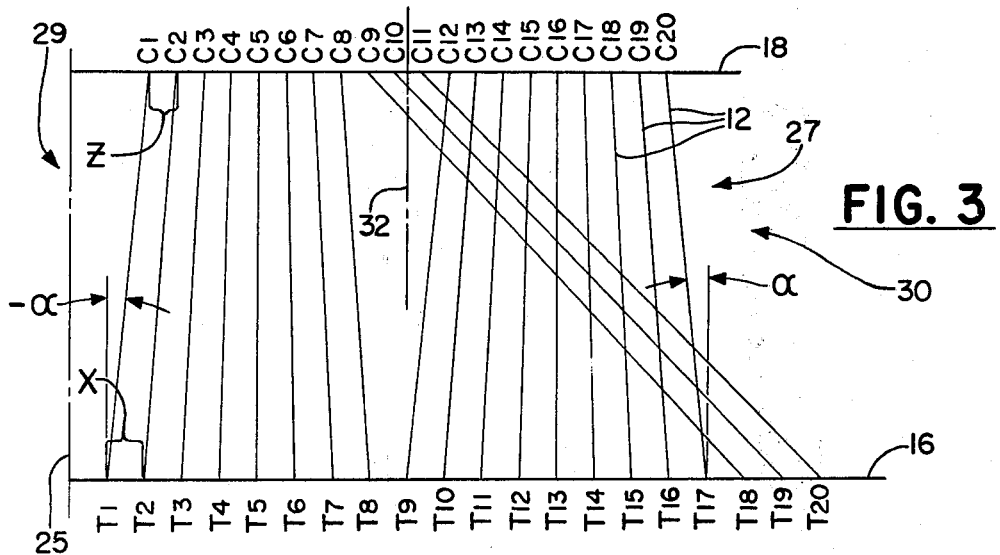
FIG. 3 illustrates the cable arrangement for the production of two slit belts simultaneously with the spacing between adjacent cables at the tensioner being greater thant that at the comb.

Referring now to FIGS. 2 through 4 various applications of the method according to the invention for reducing asymmetrical tensioning of the cables of individual ones plurality of simultaneously produced side-by-side conveyor belts are illustrated.

EXAMPLE I

It is desired to produce simultaneously two cable belts, each of the individual belts including 20 cables. The spacing between adjacent cables 12 at the tensioner 16 is less than that between adjacent cables at the comb 18. In FIG. 2 there is illustrated the cable arrangement for one of the two belts, the arrangement for the other belt being a mirror image about the equipment centerline 25. Referring to FIG. 2 it is seen that the spacing between adjacent cables 12 at the tensioner 16 is X. The spacing between adjacent cables 12 at the comb 18 is Y, which is greater than X. That cable position nearest the equipment centerline 25 at the tensioner 16 is identified as T1. That cable position farthest from the equipment centerline 25 or at the outside edge at the tensioner 16 is identified as T20. That cable position nearest the inside edge 29 or equipment centerline 25 at the comb 18 is identified as C1. That cable position at the outside edge 30 of the belt or farthest away from the equipment centerline is identified as C20. The other positions for the cables 12 at the tensioner 16 and the comb 18 are similarly identified with the lower number positions being nearer to the equipment centerline 25. This manner of labeling will prevail throughout all of the examples. When the spacing between adjacent cables 12 at the comb 18 is greater than that between adjacent cables at the tensioner 16 as in the example of FIG. 2, first there is determined the angle or the displacement of the outside edge cable as it extends from T20 to C20 relative to the longitudinal centerline 32 of the belt 28. The longitudinal centerline 32 of the belt is parallel to the equipment centerline 25. It can be seen in FIG. 2 that this angle minus $\alpha$ is approximately minus 11 degrees. After determination of the angle minus $\alpha$ attention is directed to the inside edge 29 beginning nearest the equipment centerline 25 at the tensioner 16. The angle or displacement from the equipment centerline 25 of each cable T1, T2, T3, etc., if restrung such that is was directed to comb position C1 relative to the centerline of the belt is determined. It is readily seen that cable T1 and T2 if directed to C1 would form an angle substantially less than $\alpha$ while cable T3 is positioned to extend to C1 would form an angle plus $\alpha$ of about plus 10° relative to the longitudinal direction of the belt. Cable T4 if restrung to C1 would form an angle of about plus 14° relative to the longitudinal direction of the belt 28. Thus, the first symmetrical pair can be formed by positioning cable T3 to C1 with cable C20T20 forming the other member of the pair. Two cables occupying T1 and T2 have been passed over in making this determination. The total number of cables 12 in the individual belt 28 to be produced is twenty. The number of cables 12 passed over in arriving at the cable T3C1 which if strung to form a substantially identical but opposite angle or displacement relative to the equipment centerline 25 to cable T20 C20 is two. the number of cables passed over from the tensioner edge nearest the equipment centerline is two. The number of remaining cables of the total is eighteen. One half of the number of remaining cables is nine and this is the number of cables which must be positioned at the comb toward the inside belt edge 29. Referring to FIG. 2 cables T3 through T11 are to be psoitioned to occupy comb positions C through C9. Cables occupying tensioner positions T12 through T20 and corresponding comb positions C12 through C20 remain undisturbed as originally strung. Those cables passed over in arriving at an effective number, which is two in this example, are cables T1 and T2. These are positioned by guide means so that they are directed to comb positions C10 and C11; that is, distributed evenly about the longitudinal centerline 32 of the narrow belt 29. Referring to FIG. 2, it can be seen that cables T3C1 and T20C20 which form the opposite edge cables of the narrow belt 28 are approximately symmetrical with respect to the longitudinal centerline 32 of belt 28. Similarly the next symmetrical pair includes cables T4C2 and T19C19 whcih are approximately symmetrical about the longitudinal centerline of the belt. Similarly, with regard to T5 and T19. Cables T11 and T12 from the last symmetrical pair nearest the longitudinal centerline 32 of the belt 28. Cables T1 and T2 are now directed through a much greater angle or displacement between the tensioner 16 and the comb 18 and thus their frictional losses are much greater but the difference between the two is not so great because of the increased angle or displacement. The tensioning of the cables at the edges 29,30 of the belt 28 is believed to be more critical than at the center of the belt. Cables T1 and T2 are placed in C10 and C11 in the center of the belt where they cause the least disturbance to tracking of that belt.

EXAMPLE II

In FIG. 3 there is provided a schematic cable arrangement for the production of two slit belts simultaneously when the spacing between adjacent cables 12 at the tensioner 16 exceeds that between adjacent cables at the comb 18. As before, the spacing betwen adjacent cables 12 for example, cables T1 and T2 at the tensioner 16 is X. The spacing between adjacent cables 12 for example C1, C2 at the comb 18 is Z, which is smaller than X. Also, comb position C1 is farther removed from the equipment centerline 25 than tensioner position T1. The proper edge in this instance is the outside edge 30 or that farthest removed from the equipment centerline 25. As before, beginning at the proper edge, hypothetical construction lines may be drawn from individual cable positions T20, T19, T18, T17, etc., to cable position C20 until one is found whose angle or displacement from the equipment centerline is approximtely equal in magnitude but opposite in direction relative to that cable T1C1 nearest to the longitudinal centerline 32 of the belt 27. In FIG. 3 this is readily seen to occur when cable position T17 extends to C20, the angle $\alpha$ being about5° and sloping toward the equipment centerline. The angle minus $\alpha$ of the cable at position T1 as it extneds to comb position C1 is about minus 5°. A minus angle or displacement is one in which the cable slopes away from the equipment centerline 25 as it extends from the tensioner 16 to the comb 18. A positive angle or displacement is one in which the cable slopes toward the equipment centerline in passing from the tensioner 6 to the comb 18. The number of cables 12 passed over from the proper edge, that is, the outside edge of the tensioner 16 in this instance is 3. The total number of cables 12 in the belt is 20. Substracting the number of cables passed over (three) from the total number (twenty) determines the number of cables to be shifted toward the proper edge to provide for symmetric tensioning. Because the number passed over in this instance is three, the total number is twenty, one half of the remaining is one half of seventeen or eight and one half. Since an individual cable is not to be divided, only integers are relevant in this calculation and the number of cables to be moved must be either eight or nine. In FIG. 3 nine cables were moved toward the proper edge, that is the outside edge of the belt. However, if only eight cables were moved, the symmetry of the belt would not be that much disturbed, and such arrangement is equally within contemplation of the invention. The passed over cables, that is positions T18, T19, T20 are directed to the center of the belt and occupy comb positions C9, C10 and C11/

EXAMPLE III

Referring to FIG. 4, it is desired to produce simultaneously three belts side-by-side and to provide symmetric tensioning for the cables of the individual belts thus produced. The cables of the center belt of the three belts to be simultaneously produced are not illustrated because they are symmetrically positioned about the equipment centerline 25 at both tensioner 16 and the comb 18 and the equipment centerline coincides with the belt centerline. No adjustment or repositioning of these cables is needed to produce a symmetrically tensioned center belt. With each edge belt 44 adjustment or repositioning of some of the cables 12 is required to achieve symmetric tensioning of the cables about the longitudinal centerline 45 of each edge belt. There is shown in FIG. 4 the cable arrangement for one of the edge belts. The other edge belt (not shown) would lie on the opposite side of the equipment centerline 25, and the cable arrangement required to achieve symmetric tensioning of that belt would be the mirror image of that illustrated. In this instance the spacing between adjacent cables T1 through T32 at the tensioner 16 is less than that between adjacent cables C1 through C32 at the comb 18. Because the spacing between adjacent cables 12 at the comb 18 is greater than that between adjacent cables at the tensioner 16, the proper edge, as in Example I, is the inside edge. The inside edge is that edge nearest the equipment centerline 25. The angle of the cable extending between T32 and C32 relative to the longitudinal centerline 45 is determined. Then proceeding from the proper edge, which in this instance is the inside edge, that cable position at the tensioner 16 is determined which if restrung to occupy C1 would form a nearly identical magnitude angle or displacement relative to the longitudinal centerline 45 but in the opposite direction as that formed by the cable extending between positions T32 C32. It can be seen in FIG. 4 that six cables are passed over before this point is reached. Cable T7 if positioned to extend to C1 form a nearly identical angle but of opposite sense as does cable T32

C32. The total number of cables in this belt is thirty-two. Six is the number of cables passed over in determining the first cable for the first symmetric pair. One half of the remaining number of cables is thirteen (thirty-two minus six divided by two). Those cables occupying tensioner positions T7 through T19 are moved transversely toward the proper edge, that is, the inside edge in this instance, of the belt 44 at the comb 18 to occupy comb position C1 through C13. The cables occupying tensioner positions T20 through T32 remain in their original positions and occupy positions C20 through C32 at the comb. Those cables passed over representing the effective number, which in this instance is six, are directed to the center of the belt about its longitudinal centerline 45 and occupy comb positions C14 and C19.

The symmetric tensioning arrangement of Example III which is illustrated in FIG. 4 can also be determined or verified by a number of relatively simple calculations. These are summarized in Tables 1 and 2. Referring to Table 1, the cables are identified both at the comb and at the tensioner, the lowest number representing that position nearest the equipment centerline. The distance of any given cable position from the equipment centerline at the comb is shown in column one from the left. The distance of any given cable position from the equipment centerline at the tensioner is shown in the second column from the left. The difference between these is then determined and given in column three from the left. Those figures represent the dimensions and differences before any adjustment to improve symmetry. In Table 2 are given the distances of the respective cables after adjustment for improved symmetry of the belt about its individual longitudinal centerline. As in Table 1 there is determined the distance from equipment centerline to the individual cable positions at the comb and at the tensioner. There is also determined the displacement in the transverse direction of the belt of the respective pairs of cables counted from the inside edge and outside edge of the belt. The difference between the transverse displacement for each pair is shown in the last column. It is desired to minimize this difference to achieve improved symmetry of the belt. The transverse displacement of the inside edge of the belt is the difference between the distance of that cable from the equipment centerline at the tensioner and at the comb. The inside edge transverse displacement figures correspond to the cable 1 through 13. The outside edge transverse displacement figures correspond to cables 32 through 20 in descending order. Thus when pairs of cables are compared, the first symmetric pair being cable C1 and C32, the difference is determined to be 0.221 inches. When the second symmetric pair, that is cables C2 and C31 are compared, it is seen that the difference in lateral displacement is also 0.221. If these calculations are generated for the situation in which one more or one less cable is transversely moved, then the difference values for each symmetrical pair would be larger and thus the degree of symmetry achieved would not be as great.

EXAMPLE IV

In FIG. 5 there is provided a schematic cable arrangement for the production of an edge belt which is one of three belts to be produced simultaneously. In this instance the spacing between adjacent cables 12 at the tensioner 16 is greater than the spacing between adjacent cables at the comb 18. As in Example 2, illustrated in FIG. 3, cables 12 must be positioned at the comb 18 such that an effective number of cables from the outside edge of the tensioner 16 are crossed over and fed into the center of the belt at the comb. Since the spacing between adjaent cables 12 is greater at the tensioner 16 than at the comb 18 the proper edge is the outside edge. Cables T1C1 and T28C32 form the first symmetrical pair. The effective number of cables is four. Cables ocupying T29 through T32 are positioned about the longitudinal centerline 47 of the belt 46 to occupy C15 through C18 respectively. Cables occupying T15 through T28 are shifted transversely toward the proper edge of the belt to occupy C19 through C32 respectively. It can be seen in FIG. 5 that fourteen symmetrical pairs of cables result from practice of the method of the invention.

Use of the method of the invention results in a minimum difference in angular displacement of the cables within each pair as numbered or considered from the inner and outer edges of the individual slit belt. The first pair includes the edge cables proper of the individual belt. The second pair includes the second cable toward the centerline of that belt counted from each edge of that belt. It is not necessary that the angles per se be considered. The method can be applied and is intended to also include that instance when the difference in transverse displacement relative to the longitudinal direction of the belt of the cables comprising each pair counted from the respective edges of the belt are minimized. This concept can alternately be expressed as a method for achieving symmetrical divergence, i.e., when the spacing between adjacent cables 12 at the comb 18 is greater than that between adjacent cables 12 at the tensioner 16, or convergence, i.e., when the spacing between adjacent cables 12 at the comb 18 is less than that between adjacent cables at the tensioner 6, about the longitudinal centerline of the individual slit belt. This can be accomplished by noting the spacing of each cable 12 of the belt at the tensioner 16 and at the comb 18 and the divergence or convergence from the longitudinal equipment centerline for each cable of that belt and assigning divergence or convergence values including both a magnitude and a direction relative to the equipment centerline and determining by trial and error which cables must be moved to obtain about the same divergence for the inner and outer cables of the individual slit belts.

As a general guideline, the highest degree of symmetry in the belt can be attained, if the spacing between adjacent cables 12 at the comb is less than that between adjacent cables at the tensioner 16, by taking cables off the outside edge 30 of the belt at the comb until that cable is found at the tensioner which as it extends from the tensioner 16 to the comb 18 outside edge forms about an equal and opposite angle when compared to that cable which extends at the inside edge between the tensioner and the comb, both angles taken relative to the equipment longitudinal centerline. Conversely, if the spacing between adjacent cables 12 at the comb 18 is greater than that between adjacent cables at the tensioner 16, cables are tken off the inside edge of the belt at the comb until that cable is located which when extended from the tensioner 16 to the inside edge of the belt or comb 18 forms an angle of about the same magnitude but of opposite direction as that cable coming from the outside edge of the tensioner to the outside edge of the comb, both angles taken relative to the equipment longitudinal centerline.

While certain representative examples, embodiments and details have been shown for the purpose of illustrating the invention, it will be apparent to those skilled in the art that various changes and modifications may be made therein and that the method of the invention may be described in differing language without departing from the spirit or scope of the invention.

TABLE 1

Cable Distance From Equipment Centerline Before Any Adjustments

| Position # | At Comb | At Tensioner | Difference |
|---|---|---|---|
| 1 | 13.300 | 11.649 | 1.651 (13.300–11.649) |
| 2 | 14.029 | 12.355 | 1.674 |
| 3 | 14.758 | 13.061 | 1.697 |
| 4 | 15.487 | 13.767 | 1.720 |
| 5 | 16.216 | 14.473 | 1.743 |
| 6 | 16.945 | 15.179 | 1.766 |
| 7 | 17.674 | 15.885 | 1.789 |
| 8 | 18.403 | 16.591 | 1.812 |
| 9 | 19.132 | 17.297 | 1.835 |
| 10 | 19.861 | 18.003 | 1.858 |
| 11 | 20.590 | 18.709 | 1.881 |
| 12 | 21.319 | 19.415 | 1.904 |
| 13 | 22.048 | 20.121 | 1.927 |
| 14 | 22.777 | 20.827 | 1.950 |
| 15 | 23.506 | 21.533 | 1.973 |
| 16 | 24.325 | 22.239 | 1.996 |
| 17 | 24.964 | 22.945 | 2.019 |
| 18 | 25.693 | 23.651 | 2.042 |
| 19 | 26.422 | 24.357 | 2.065 |
| 20 | 27.151 | 25.063 | 2.088 |
| 21 | 27.880 | 25.769 | 2.111 |
| 22 | 28.609 | 26.475 | 2.134 |
| 23 | 29.338 | 27.181 | 2.157 |
| 24 | 30.067 | 27.887 | 2.180 |
| 25 | 30.796 | 28.593 | 2.203 |
| 26 | 31.525 | 29.299 | 2.226 |
| 27 | 32.254 | 30.005 | 2.249 |
| 28 | 32.983 | 30.711 | 2.272 |
| 29 | 33.712 | 31.417 | 2.295 |
| 30 | 34.441 | 32.123 | 2.318 |
| 31 | 35.170 | 32.829 | 2.341 |
| 32 | 35.899 | 33.535 | 2.364 |

TABLE 2

After Adjustment for Improved Symmetry Distance from Equipment Centerline

| Position # | At Comb | At Tensioner |
|---|---|---|
| 1 | 13.300 | 15.885 |
| 2 | 14.029 | 16.591 |
| 3 | 14.758 | 17.297 |
| 4 | 15.487 | 18.003 |
| 5 | 16.216 | 18.709 |
| 6 | 16.945 | 19.415 |
| 7 | 17.674 | 20.121 |
| 8 | 18.403 | 20.827 |
| 9 | 19.132 | 21.533 |
| 10 | 19.861 | 22.239 |
| 11 | 20.590 | 22.945 |
| 12 | 21.319 | 23.651 |
| 13 | 22.048 | 24.357 |
| 14 | 22.777 | 11.649 |
| 15 | 23.506 | 12.355 |
| 16 | 24.235 | 13.061 |
| 17 | 24.964 | 13.767 |
| 18 | 25.693 | 14.473 |
| 19 | 26.422 | 15.179 |
| 20 | 27.151 | 25.063 |
| 21 | 27.880 | 25.769 |
| 22 | 28.609 | 26.475 |
| 23 | 29.338 | 27.181 |
| 24 | 30.067 | 27.887 |
| 25 | 30.796 | 28.593 |
| 26 | 31.525 | 29.299 |
| 27 | 32.254 | 30.005 |
| 28 | 32.983 | 30.711 |
| 29 | 33.712 | 31.417 |
| 30 | 34.441 | 32.123 |
| 31 | 35.170 | 32.829 |
| 32 | 35.889 | 33.535 |

After Adjustment for Improved Symmetry

| Position # | Inside Edge | Position # | Outside Edge | Difference |
|---|---|---|---|---|
| C1 | 2.585 | C32 | 2.364 | .221 |
| C2 | 2.562 | C31 | 2.341 | .221 |
| C3 | 2.539 | C30 | 2.318 | .221 |
| C4 | 2.516 | C29 | 2.295 | .221 |
| C5 | 2.493 | C28 | 2.272 | .221 |
| C6 | 2.470 | C27 | 2.249 | .221 |
| C7 | 2.447 | C26 | 2.226 | .221 |
| C8 | 2.424 | C25 | 2.203 | .221 |
| C9 | 2.401 | C24 | 2.180 | .221 |
| C10 | 2.378 | C23 | 2.157 | .221 |
| C11 | 2.355 | C22 | 2.134 | .221 |
| C12 | 2.332 | C21 | 2.111 | .221 |
| C13 | 2.309 | C20 | 2.088 | .221 |

I claim:

1. In the manufacture of a cable belt of the type including a plurality of parallel cables embedded in polymeric compound, said cables extending throughout the lengthwise direction of the belt and being spaced apart from one another in the transverse direction of the belt, wherein the longitudinal centerline of said belt differs from the longitudinal centerline of the equipment on which it is to be produced, wherein the cables of said belt are tensioned by a tensioner positioned between a cable letoff and a spacing comb, wherein the spacing between adjacent cables of said belt is different at said tensioner from that at said comb, wherein the improvement comprises a method for reducing asymmetry of tension of the cables of said belt about the longitudinal centerline of said belt, comprising:

determining the proper edge of said belt,
determining the effective number of cables from the proper edge at said tensioner,
positioning said effective number of cables of said belt transversely at the comb such that they extend from tensioner positions nearest the proper edge to comb positions distributed substantially equally about the longitudinal centerline of said belt,
positioning one-half of the remaining cables of said belt transversely at the comb an effective number of spaces toward the proper edge.

2. The method of claim 1, wherein the spacing between adjacent cables of the belt at the tensioner is less than that between adjacent cables of the belt at the comb and the proper edge is that nearest to the longitudinal centerline of the equipment.

3. The method of claim 1, wherein the spacing between adjacent cables of the belt at the tensioner is greater than that between adjacent calbes of the belt at the comb and the proper edge is that farthest from the longitudinal centerline of the equipment.

4. In the manufacture of a cable belt of the type including a plurality of parallel cables embedded in polyumeric compound, said cables extending throughout the lengthwise direction of the belt and being spaced apart form one another in the transverse direction of the belt, wherein the longitudinal centerline of said belt differs from the longitudinal centerline of the equipment on which it is produced, said equipment including a cable letoff, a cable tensioner and a spacing comb, wherein all cables of said belt are tensioned by means of the tensioner which is positioned between the cable letoff and the comb, the spacing between adjacent cables of said belt at said tensioner being different than the spacing between adjacent cable of said belt at said comb, wherein the improvement comprises a method for reducing asymmetry of tension of the cables of said belt about the longitudinal centerline of said belt, comprising:

determining the proper edge of the belt, determining the angular displacement of that cable which is opposite the proper edge relative to the longitudinal centerline of the belt as it extends between the tensioner and the comb, determining that cable nearest the proper edge which if positioned so as to extend from the tensioner to the proper edge of the belt at the comb would have an angular displacement of about the same magnitude but opposite sense relative to the longitudinal centerline of belt as it extends between the tensioner and the comb when compared to the angular displacement of that cable which is opposite the proper edge, determining the total number of cables in said belt, determining the number of cables passed over nearest the proper edge at the tensioner in determining that cable which if positioned so as to extend from the tensioner to the proper edge at the comb would have an angular displacement of about the same magnitude but opposite sense relative to the longitudinal centerline of the belt as it extends between the tensioner and the comb when compared to the angular displaement of that cable which is opposite the proper edge as it extends from the tensioner to the comb, taking one-half of the cables not passed over from the proper edge at the tensioner and positioning these cables at the comb to occupy in sequence those positions nearest the proper edge of the belt, positioning those cables passed over nearest the proper edge at the tensioner to occupy sequence positions at the comb distributed approximately equally about the longitudinal centerline of the belt, the passed over cables crossing over the cables which form the proper edge of the belt.

5. In the manufacture of a cable belt of the type including a plurality of parallel cables embedded in polymeric compound, said cables extending throughout the lengthwise direction of the belt and being spaced apart from one another in the transverse direction of the belt, wherein the longitudinal centerline of said belt differs from the longitudinal centerline of the equipment on which it is to be produced, wherein the cables of said belt are tensioned by means of a tensioner positioned between a cable letoff and a spacing comb, wherein the spacing between adjacent cables of said belt at said tensioner is greater than the spacing between adjacent cables at said comb, wherein the improvement comprises a method for obtaining substantially symmetric angular displacement of pairs of said cables at and adjacent the edges of said belt relative to the longitudinal centerline of said belt, each cable pair including an inside cable counted from the inside belt edge nearest the equipment centerline at the comb and a corresponding outside cable counted from the outside belt edge farthest from the equipment centerline at the comb, comprising:

determining the angular displacement of the inside belt edge cable as it extends between the tensioner and the comb relative to the longitudinal centerline of the belt, determining that cable nearest the outside edge at the tensioner which if positioned so as to extend to the outside edge of the belt at the comb would have an angular displacement relative to the longtiduinal centerline of the belt of about equal magnitude but opposite sense when compared to that of the inside belt edge cable as it extends between the tensioner and comb relative to the longitudinal centerline of the belt, determining the total number of cables in said belt, determining the number of cables passed over from the outside edge at the tensioner and determining that cable which when positioned at the outside edge of the belt at the comb would form a symmetric pair when considered with the inside edge cable, taking one-half of the remaining cables nearest the outside edge at the tensioner and positioning those cables at the comb to occupy those corresponding positions nearest to the outside edge of the belt, and positioning those cables passed over nearest the outside edge at the tensioner to occupy those positions at the comb distributed approximately evenly about the longitudinal centerline of the belt, the passed over cables crossing over the cables which form the outside edge of the belt.

6. In the manufacture of a cable belt of the type including a plurality of parallel cables embedded in polymeric compound, said cables extending throughout the lengthwise direction of the belt and being spaced apart from one another in the transverse direction of the belt, wherein the longitudinal centerline of said belt differs from the longitudinal centerline of the equipment on which it is to be produced, wherein the cables of said belt are tensioned by means of a tensioner positioned between a cable letoff and a spacing comb, wherein the spacing between adjacent cables of said belt at said tensioner is less thant the spacing between adjacent cables of said belt at said comb, wherein the improvement comprises a method for obtaining substantially symmetric angular displacement of pairs of said cables at and ajacent the edges of said belt relative to the longitudinal centerline of said belt, each cable pair including one inside cable counted from the inside belt edge nearest the equipment centerline at the comb and the corresponding outside cable ounted from the outside belt edge farthest from the equipment centerline at the comb, comprising:

determining the angular displacement of the outside cable at the tensioner as it extends to the outside belt edge at the comb with respect to the longitudinal centerline of the belt, determining that cable nearest the equipment centerline at the tensioner which if positioned so as to extend to the inside edge of the belt at the comb would have an angular displacement relative to the longitudinal centerline of the belt of about equal magnitude but opposite sense when compared to that of the outside belt edge cable as it extends between the tensioner and comb relative to the longitudinal centerline of the belt, determining the total number of cables in said belt, subtracting from the total number of cables in said belt the number of cables passed over at the tensioner from nearest the centerline of the equipment in determining the inside cable which if positioned at the inside belt edge would form a symmetric pair with the outside belt edge cable, taking one-half of the remaining cables nearest the equipment centerline at the tensioner and positioning them at the comb to occupy those corresponding comb positions nearest the inside belt edge, and positioning those cables passed over nearest the equipment centerline at the tensioner to occupy those comb positions approximately evenly distributed about the longitudinal centerline of the belt, the passed over cable crossing over the cables which form the inside edge of the belt.

* * * * *

UNITED STATES PATENT AND TRADEMARK OFFICE
CERTIFICATE OF CORRECTION

PATENT NO. : 4,257,833
DATED : March 24, 1981
INVENTOR(S) : Larry W Jensen

It is certified that error appears in the above-identified patent and that said Letters Patent are hereby corrected as shown below:

```
Column 2, line 13, "cneter" should be -- center --;
          line 28, "belts" should be -- belt --.

Column 3, line 31, "greates" should be -- greatest --;
          line 33, "6" should be -- 16 --;
          line 65, "acorss" should be -- across --.

Column 4, line 12, "17" should be -- 18 --.

Column 5, line 9,  "the" should be -- The --;
          line 15, "C" should be -- Cl --;
          line 31, "T19" should be -- T18 --.

Column 6, line 1,  "extneds" should be -- extends --;
          line 6,  "6" should be -- 16 --;
          line 27, "C11/" should be -- C11. --.
```

UNITED STATES PATENT AND TRADEMARK OFFICE
CERTIFICATE OF CORRECTION

PATENT NO. : 4,257,833
DATED : March 24, 1981
INVENTOR(S) : Larry W Jensen

It is certified that error appears in the above-identified patent and that said Letters Patent are hereby corrected as shown below:

Column 7, line 48, "cable" should be -- cables --;
        line 57, delete "the".

Claim 3, line 3, "calbes" should be -- cables --.

Claim 4, line 3, "lyumeric" should be -- lymeric --;
        line 14, "cable" should be -- cables --.

Signed and Sealed this

Third Day of November 1981

[SEAL]

*Attest:*

GERALD J. MOSSINGHOFF

*Attesting Officer*      *Commissioner of Patents and Trademarks*